United States Patent
Chavan et al.

(10) Patent No.: US 11,855,834 B2
(45) Date of Patent: Dec. 26, 2023

(54) TRAFFIC SINK INTERFACE

(71) Applicant: Apple Inc., Cupertino, CA (US)

(72) Inventors: Sushant U. Chavan, San Jose, CA (US); Thomas F. Pauly, Campbell, CA (US)

(73) Assignee: Apple Inc., Cupertino, CA (US)

( * ) Notice: Subject to any disclaimer, the term of this patent is extended or adjusted under 35 U.S.C. 154(b) by 93 days.

(21) Appl. No.: 17/007,322

(22) Filed: Aug. 31, 2020

(65) Prior Publication Data

US 2021/0377100 A1     Dec. 2, 2021

Related U.S. Application Data

(60) Provisional application No. 63/033,632, filed on Jun. 2, 2020.

(51) Int. Cl.
| | |
|---|---|
| *H04L 41/0654* | (2022.01) |
| *H04W 4/80* | (2018.01) |
| *H04L 41/0893* | (2022.01) |
| *H04W 84/12* | (2009.01) |

(52) U.S. Cl.
CPC ...... *H04L 41/0654* (2013.01); *H04L 41/0893* (2013.01); *H04W 4/80* (2018.02); *H04W 84/12* (2013.01)

(58) Field of Classification Search
CPC ............. H04L 41/0654; H04L 41/0893; H04L 2012/64413; H04L 2012/5619; H04W 4/80; H04W 84/12

See application file for complete search history.

(56) References Cited

U.S. PATENT DOCUMENTS

| | | | |
|---|---|---|---|
| 5,754,765 A * | 5/1998 | Danneels | H04N 7/15 |
| | | | 348/E7.083 |
| 7,145,887 B1 | 12/2006 | Akgun et al. | |
| 7,769,806 B2 | 8/2010 | Wie et al. | |
| 10,038,626 B2 | 7/2018 | Sorenson, III et al. | |
| 10,237,140 B2 * | 3/2019 | Cordray | H04L 67/1001 |
| 2003/0204631 A1 * | 10/2003 | Pinkerton | H04L 69/16 |
| | | | 709/249 |

(Continued)

FOREIGN PATENT DOCUMENTS

KR     20140111010 A * 9/2014 ....... H04N 21/43615

*Primary Examiner* — Patrice L Winder
*Assistant Examiner* — Angela M Widhalm De Rodriguez
(74) *Attorney, Agent, or Firm* — Fletcher Yoder, P.C.

(57) ABSTRACT

An electronic device includes a traffic redirect module that creates a traffic sink interface that enables data to be sent to it, without generating an error if an underlying physical link does not exist. To send data over a physical link, a processor of the electronic device creates a network interface to connect to another electronic device using a transport connection over the physical link. If the physical link disconnects, then the processor removes the network interface, and the traffic redirect module redirects data to be sent to the other electronic device to use the traffic sink interface, without indicating that the physical link has disconnected. When the physical link reconnects, or a new physical link to the other electronic device is established, the processor creates a new network interface to connect to the other electronic device using the transport connection over the reconnected or new physical link.

20 Claims, 9 Drawing Sheets

(56) References Cited

U.S. PATENT DOCUMENTS

| | | | |
|---|---|---|---|
| 2006/0271681 A1* | 11/2006 | Apreutesei | H04L 67/24 709/226 |
| 2013/0295921 A1 | 11/2013 | Bhargava et al. | |
| 2014/0351832 A1* | 11/2014 | Cho | H04L 67/141 719/328 |
| 2015/0156122 A1* | 6/2015 | Singh | H04L 61/1511 370/235 |
| 2017/0126626 A1* | 5/2017 | Datta | H04L 63/0272 |
| 2020/0112487 A1 | 4/2020 | Inamdar et al. | |

* cited by examiner

TRAFFIC SINK INTERFACE

CROSS-REFERENCE TO RELATED APPLICATION

This application claims the benefit of U.S. Provisional Application No. 63/033,632, filed Jun. 2, 2020, which is hereby incorporated by reference in its entirety for all purposes.

BACKGROUND

The present disclosure relates generally to computer networks, and more particularly to maintaining a connection between computing devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Computing devices may establish a physical link (e.g., via Bluetooth, Wi-Fi, Wide Area Network (WAN), and the like) between one another to send and receive data. To ensure that the data is sent to the right entities, that the data is secure, that there are no errors in the data, and so on, a transport connection (e.g., a Transmission Control Protocol (TCP) or User Datagram Protocol (UDP) connection) may be established over the physical link.

Periodically, the physical link may disconnect, for example, due to a computing device moving out of range of a connected computing device or there is congestion on the physical link. As a result, applications running on the computing device may pause or stop running altogether while the computing device attempts to reconnect the physical link, contributing to a negative user experience.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

An electronic device may include a traffic redirect module that creates a traffic sink interface at the transport layer that enables data to be sent to it, without generating an error if an underlying physical link does not exist. The traffic redirect module may be software that exists as machine-readable instructions stored on a memory or storage device that are executable by a processor of the electronic device, firmware stored on the memory or storage device, and/or hardware of the electronic device. When the electronic device connects to another electronic device to send and receive data, it does so over a physical link (e.g., via Bluetooth, Wi-Fi, Wide Area Network (WAN), and the like). The processor also creates a network interface to connect to the other electronic device using a transport connection (e.g., a Transmission Control Protocol (TCP) or User Datagram Protocol (UDP) connection) over the physical link. The processor then installs policies in a system policy table to steer data to be sent to the other electronic device over the transport connection to use the network interface.

If the physical link disconnects, then the processor removes the network interface (e.g., to release memory taken up by the network interface). Many times, the physical link may only temporarily disconnect, such as when the electronic device moves out of range of the other electronic device or there is congestion on the physical link. Thus, the physical link may reconnect in a short time (e.g., when the electronic device moves back within range of the other electronic device or congestion on the physical link clears).

Rather than causing a user to experience a disconnection at the transport layer due to temporary disconnection of the physical link, the traffic redirect module may redirect data to be sent to the other electronic device to use the traffic sink interface. In particular, the traffic redirect module may install policies in the system policy table to steer data to be sent to the other electronic device to use the traffic sink interface. The traffic redirect module may configure the traffic sink interface to have similar characteristics as the removed network interface, such as the same address assignment, same supporting routes, and so on. As such, the processor sends data over the transport connection using the traffic sink interface, rather than indicating that the physical link has disconnected.

When the physical link reconnects, or a new physical link to the other electronic device is established, the processor creates a new network interface to connect to the other electronic device using the transport connection over the reconnected or new physical link. The processor then reinstalls the policies in the system policy table to steer data to be sent to the other electronic device over the transport connection to use the new network interface.

In this manner, the traffic redirect module preserves the transport connection when an underlying physical link temporarily disconnects, thus avoiding a negative user experience.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment", "an embodiment", or "in some embodiments" of the present disclosure are not intended to be interpreted as excluding the existence of additional embodiments that also incorporate the recited features.

The disclosed embodiments may apply to a variety of electronic devices. In particular, any electronic device that transmits or receives signals over a communication network may incorporate the disclosed traffic redirect module or techniques to preserve a transport connection when an underlying physical link temporarily disconnects. With the foregoing in mind, a general description of suitable electronic devices that may include the disclosed traffic redirect module or techniques is provided below.

Figure 1:
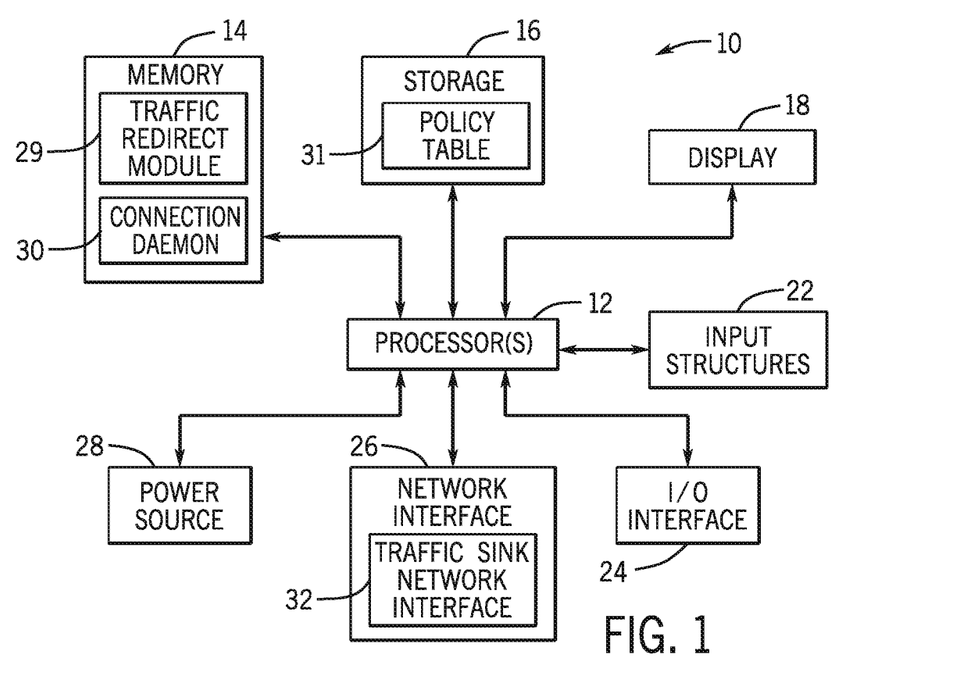
FIG. 1 is a schematic block diagram of an electronic device including a transceiver, in accordance with an embodiment.

Turning first to FIG. 1, an electronic device 10 according to an embodiment of the present disclosure may include, among other things, one or more of processors 12, memory 14, nonvolatile storage 16, a display 18, input structures 22, an input/output (I/O) interface 24, a network interface 26, and a power source 28. The various functional blocks shown in FIG. 1 may include hardware elements (including circuitry), software elements (including computer code stored on a computer-readable medium) or a combination of both hardware and software elements. Furthermore, a combination of elements may be included in tangible, non-transitory, and machine-readable medium that include machine-readable instructions. The instructions may be executed by the processor 12 and may cause the processor 12 to perform operations as described herein. It should be noted that FIG. 1 is merely one example of a particular embodiment and is intended to illustrate the types of elements that may be present in the electronic device 10. Additionally, reference to the processor 12 in the present disclosure should be understood to include any processor or combination of processors of the one or more of processors 12.

Figure 2:
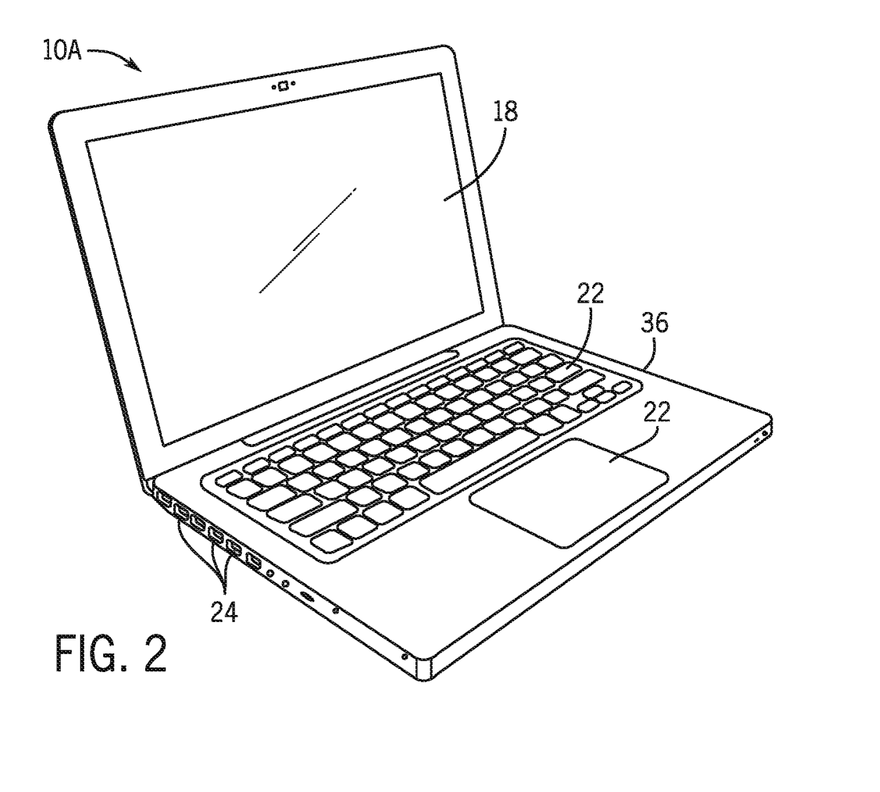
FIG. 2 is a perspective view of a notebook computer representing a first embodiment of the electronic device of FIG. 1.
Figure 3:
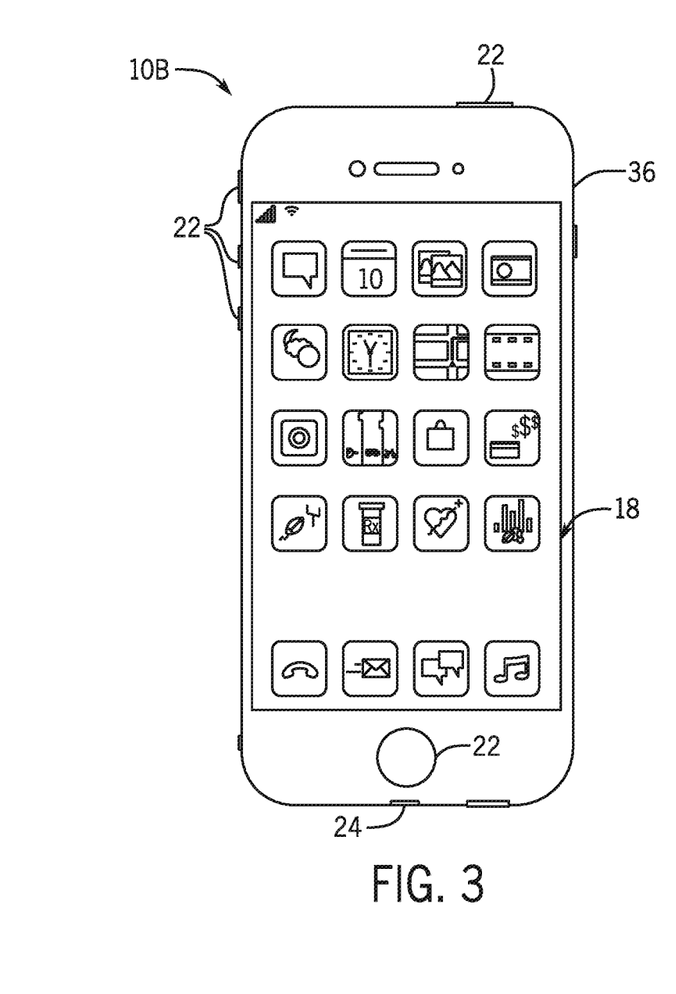
FIG. 3 is a front view of a handheld device representing a second embodiment of the electronic device of FIG. 1.
Figure 4:
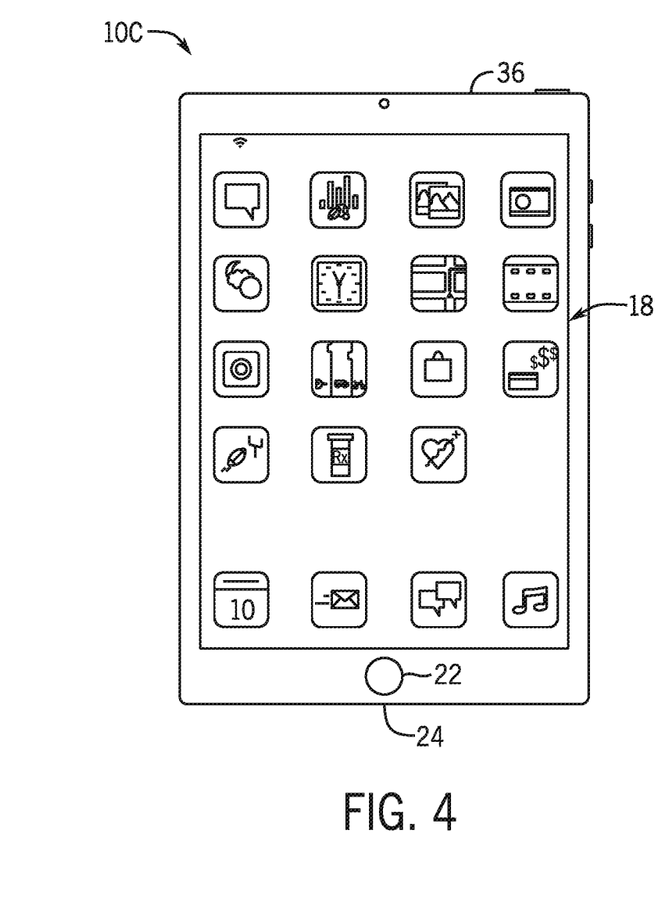
FIG. 4 is a front view of another handheld device representing a third embodiment of the electronic device of FIG. 1.
Figure 5:
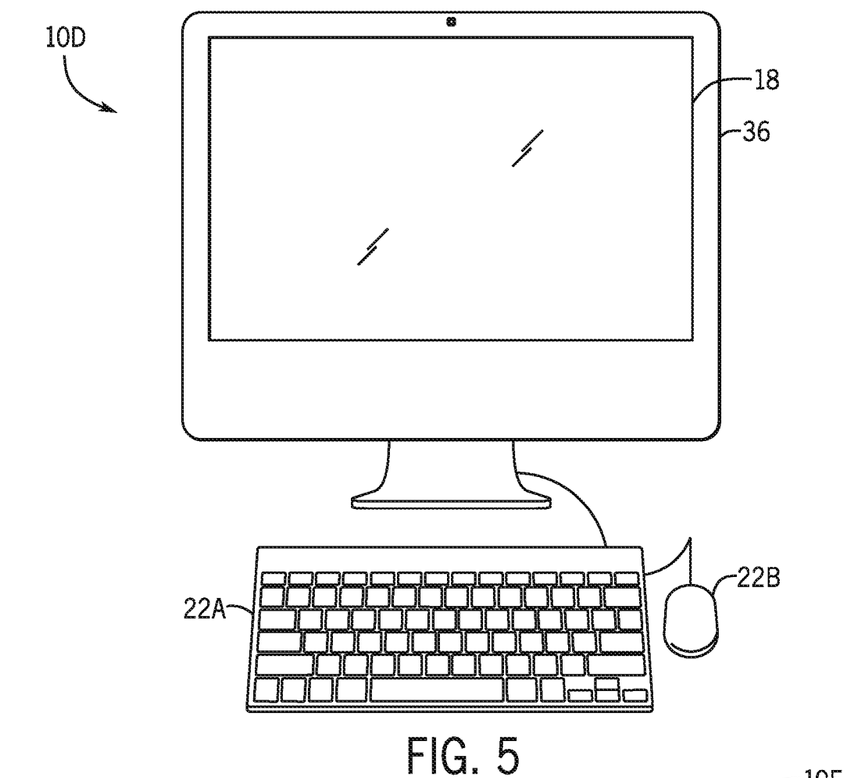
FIG. 5 is a front view of a desktop computer representing a fourth embodiment of the electronic device of FIG. 1.
Figure 6:
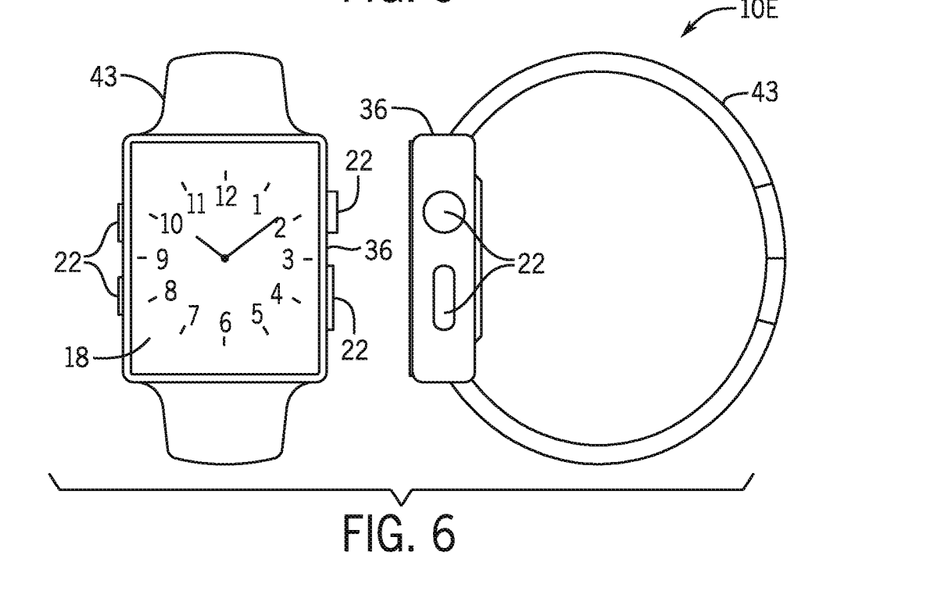
FIG. 6 is a front view and side view of a wearable electronic device representing a fifth embodiment of the electronic device of FIG. 1.

By way of example, a block diagram of the electronic device 10 may represent the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor 12 may operably couple with the memory 14 and the nonvolatile storage 16 to perform various algorithms. Such programs or instructions executed by the processor 12 may be stored in any suitable article of manufacture that includes one or more tangible, computer-readable media at least collectively storing the instructions or processes, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions executable by the processor 12 to enable the electronic device 10 to provide various functionalities.

As illustrated, the memory 14 may store a traffic redirect module 29 as instructions executable by the processor 12. The traffic redirect module 29 may redirect traffic (e.g., data sent from the electronic device 10) to a traffic sink interface when an underlying physical link disconnects, and redirect the traffic to a new network interface (e.g., 26), when the physical link reconnects or a new physical link is established. The memory 14 may additionally or alternatively store a connection daemon 30 that enables connecting the electronic device 10 to other electronic devices, sets up secure links between the electronic device 10 to and the other electronic devices, manages connectivity between the electronic device 10 to and the other electronic devices, and so on. While the traffic redirect module 29 and the connection daemon 30 are illustrated as being stored in the memory 14, it should be understood that these elements may be stored in any suitable medium or component, such as the storage 16 and/or the network interface 26. Moreover, while the traffic redirect module 29 is described as software, it should be understood that the traffic redirect module 29 may be implemented, in whole or in part, as firmware (e.g., stored on the memory 14 or storage 16) and/or hardware (e.g., as part of the processor 12 and/or the network interface 26) of the electronic device 10.

The storage 16 may store a policy table 31 that stores policies that the processor 12 follows to steer or direct data sent by the electronic device 10. In particular, the policy table 31 may store a policy identifying a network interface (e.g., 26) to use for sending outgoing data.

In certain embodiments, the display 18 may be a liquid crystal display (LCD), which may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable the electronic device 10 to interface with various other electronic devices, as may the network interface 26.

The network interface 26 may include, for example, one or more interfaces for a personal area network (PAN), such as a BLUETOOTH® network, for a local area network (LAN) or wireless local area network (WLAN), such as an 802.11x WI-FI® network, and/or for a wide area network (WAN), such as a $3^{rd}$ generation (3G) cellular network, $4^{th}$ generation (4G) cellular network, long term evolution (LTE®) cellular network, long term evolution license assisted access (LTE-LAA) cellular network, $5^{th}$ generation (5G) cellular network, or New Radio (NR) cellular network. The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth. The network interface 26 may be implemented as software (e.g., as a logical construct) and/or hardware (e.g., as a network interface controller, card, or adapter).

As illustrated, the network interface 26 may include a traffic sink interface 32. The traffic sink interface 32 may be created at the transport layer (e.g., by the processor 12 through, for example, the traffic redirect module 29) that enables data to be sent to it, without generating an error if an underlying physical link does not exist (e.g., refrains from generating a physical link disconnection error).

As further illustrated, the electronic device 10 may include the power source 28. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may be generally portable (such as laptop, notebook, and tablet computers) and/or those that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. of Cupertino, California By way of example, the electronic device 10, taking the form of a notebook computer 10A, is illustrated in FIG. 2 in accordance with one embodiment of the present disclosure. The notebook computer 10A may include a housing or the enclosure 36, the display 18, the input structures 22, and ports associated with the I/O interface 24. In one embodiment, the input structures 22 (such as a keyboard and/or touchpad) may enable interaction with the notebook computer 10A, such as starting, controlling, or operating a graphical user interface (GUI) and/or applications running on the notebook computer 10A. For example, a keyboard and/or touchpad may facilitate user interaction with a user interface, GUI, and/or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, California. The handheld device 10B may include the enclosure 36 to protect interior elements from physical damage and to shield them from electromagnetic interference. The enclosure 36 may surround the display 18. The I/O interface 24 may open through the enclosure 36 and may include, for example, an I/O port for a hard wired connection for charging and/or content manipulation using a standard connector and protocol, such as the Lightning connector provided by Apple Inc. of Cupertino, California, a universal serial bus (USB), or other similar connector and protocol.

The input structures 22, in combination with the display 18, may enable user control of the handheld device 10B. For example, the input structures 22 may activate or deactivate the handheld device 10B, navigate a user interface to a home screen, present a user-editable application screen, and/or activate a voice-recognition feature of the handheld device 10B. Other of the input structures 22 may provide volume control, or may toggle between vibrate and ring modes. The input structures 22 may also include a microphone to obtain a user's voice for various voice-related features, and a speaker to enable audio playback. The input structures 22 may also include a headphone input to enable input from external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, California.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. of Cupertino, California. It should be noted that the computer 10D may also represent a personal computer (PC) by another manufacturer. The enclosure 36 may protect and enclose internal elements of the computer 10D, such as the display 18. In certain embodiments, a user of the computer 10D may interact with the computer 10D using various peripheral input devices, such as keyboard 22A or mouse 22B (e.g., input structures 22), which may operatively couple to the computer 10D.

Similarly, FIG. 6 depicts a wearable electronic device 10E representing another embodiment of the electronic device 10 of FIG. 1. By way of example, the wearable electronic device 10E, which may include a wristband 43, may be an Apple Watch® by Apple Inc. of Cupertino, California. However, in other embodiments, the wearable electronic device 10E may include any wearable electronic device such as, a wearable exercise monitoring device (e.g., pedometer, accelerometer, heart rate monitor), or other device by another manufacturer. The display 18 of the wearable electronic device 10E may include a touch screen version of the display 18 (e.g., LCD, OLED display, active-matrix organic light emitting diode (AMOLED) display, and so forth), as well as the input structures 22, which may facilitate user interaction with a user interface of the wearable electronic device 10E.

In certain embodiments, as previously noted above, each embodiment (e.g., notebook computer 10A, handheld device 10B, handheld device 10C, computer 10D, and wearable electronic device 10E) of the electronic device 10 may include the disclosed traffic redirect module 29 or techniques to preserve a transport connection when an underlying physical link temporarily disconnects.

Figure 7:
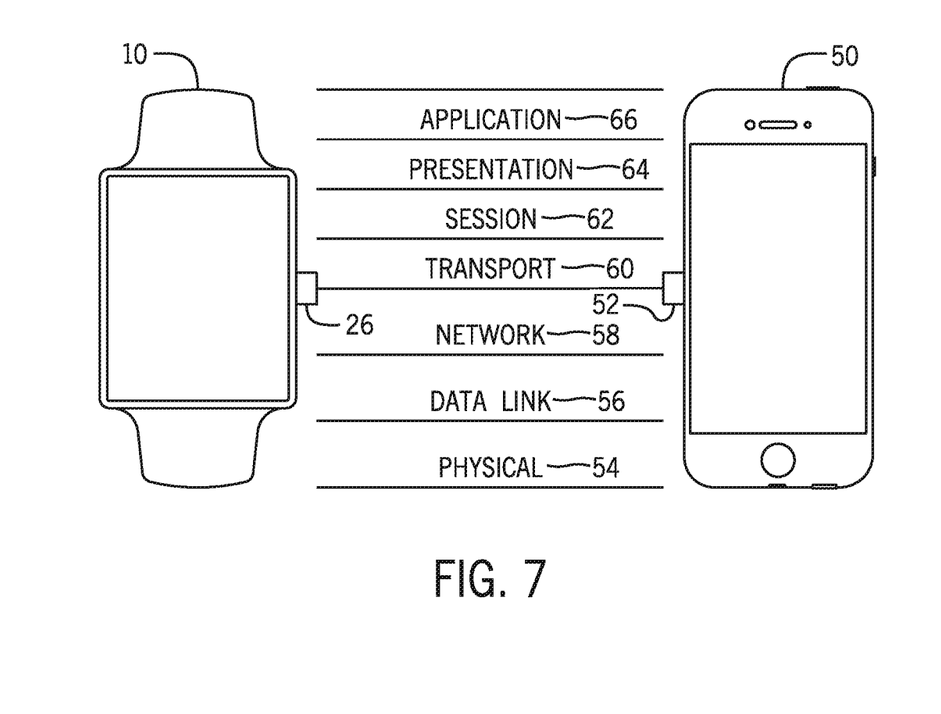
FIG. 7 is a diagram showing the electronic device of FIG. 1 communicating with another electronic device and corresponding Open Systems Interconnection model layers, according to embodiments of the present disclosure.

With the foregoing in mind, FIG. 7 is a diagram showing the electronic device 10 communicating with another electronic device 50 and the corresponding Open Systems Interconnection (OSI) model layers, according to embodiments of the present disclosure. As illustrated, the electronic device 10 may communicate with the other electronic device 50 via respective network interfaces 26, 52. The OSI model layers include a physical layer 54, a data link layer 56, a network layer 58, a transport layer 60, a session layer 62, a presentation layer 64, and an application layer 66. In particular, because the disclosed traffic redirect module 29 and techniques maintain a transport connection, such as a Transmission Control Protocol (TCP) or User Datagram Protocol (UDP) connection, the disclosed traffic redirect module 29 and techniques relate to the transport layer 60, when an underlying physical link, such as a Bluetooth, Wi-Fi, or Wide Area Network (WAN) link representative of the physical layer 54, disconnects. The network interface 26, which may be created and removed when the physical link is respectively established and disconnected, may be representative of the network layer 58.

Figure 8:
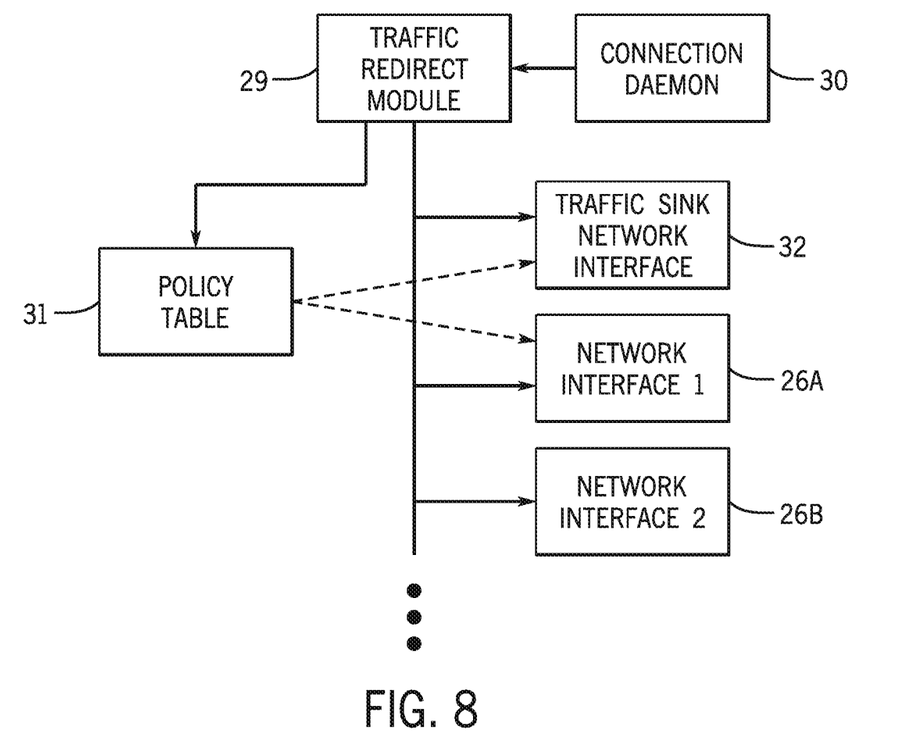
FIG. 8 is a block diagram illustrating relationships between components of the electronic device of FIG. 1 for maintaining a transport connection when an underlying physical link temporarily disconnects, according to embodiments of the present disclosure.

FIG. 8 is a block diagram illustrating relationships between components for maintaining a transport connection when an underlying physical link temporarily disconnects, according to embodiments of the present disclosure. As illustrated the traffic redirect module 29 may steer or direct traffic (e.g., outgoing data packets from the electronic device 10) to the network interface 26 ("Network Interface 1") or the traffic sink interface 32. As mentioned above the network interface 26 may be created and removed when the physical link is respectively established and disconnected. In particular, the physical link may be any suitable transport type that connects the electronic device 10 to another electronic device, such as Bluetooth, Wi-Fi, or WAN (e.g., cellular and/or Wi-Fi). As an example, the network interface 26 may be an Internet Protocol Security (IPSec) interface that enables use of the IPSec secure network protocol suite to authenticate and encrypt packets of data to provide secure encrypted communication between the two electronic devices over an Internet Protocol (IP) network.

As mentioned above, the processor 12 may create establish the physical link, generate the "Network Interface 1" 26A (e.g., as a logical construct), and may also establish a transport connection (e.g., a TCP or UDP connection) over the physical link. The processor 12 may install one or more policies in the policy table 31 to steer data to be sent to the other electronic device over the transport connection to use the generated Network Interface 1.

If the physical link disconnects, then the processor 12 removes Network Interface 1. This may be to release memory taken up by Network Interface 1, to authenticate the other electronic device through renegotiating new "Network Interface 2" 26B (e.g., through an IPSec negotiation), and so on. Many times, the physical link may only temporarily disconnect, such as when the electronic device 10 moves out of range of the other electronic device or there is congestion on the physical link. Thus, the physical link may reconnect in a short time (e.g., when the electronic device 10 moves back within range of the other electronic device or congestion on the physical link clears).

Rather than causing a user to experience a disconnection at the transport layer due to temporary disconnection of the physical link, the traffic redirect module 29 may redirect data to be sent to the other electronic device to use the traffic sink interface 32. In particular, the traffic redirect module 29 may install policies in the policy table 31 to steer data to be sent to the other electronic device to use the traffic sink interface 32. The traffic redirect module 29 may configure the traffic sink interface 32 to have similar characteristics as the removed Network Interface 1, such as the same address assignment (e.g., the same network address), same supporting routes (e.g., same network routing paths), and so on. As such, the processor 12 sends data over the transport connection using the traffic sink interface 32, rather than indicating that the physical link has disconnected.

The traffic sink interface 32 may be created by the traffic redirect module 29, the connection daemon 30, the processor 12, or any other suitable entity. In some embodiments, the processor 12 may generate the traffic sink interface 32 as long as the connection daemon 30 is running on the electronic device 10, since the connection daemon 30 sets up and manages connectivity between the electronic device 10 to other electronic devices. It should be understood that the traffic sink interface 32 does not have an underlying physical link, and, as such, while it may receive data via the transport connection, it will not send data back—it acts as a "traffic sink".

When the physical link reconnects, or a new physical link to the other electronic device is established, the processor 12 creates the new Network Interface 2 to connect to the other electronic device using the transport connection over the reconnected or new physical link. The processor 12 then reinstalls the policies in the policy table 31 to steer data to be sent to the other electronic device over the transport connection to use the new Network Interface 2.

Thus, from the viewpoint of a user using the electronic device 10, when the physical link disconnects, the user may not receive an indication of the disconnection. At worst, the user may experience a delay in sending or receiving data, without receiving a connection problem prompt or disconnection indicator. When the physical link reconnects, or a new physical link is re-established, the user may continue to use the electronic device 10 as normal, without realizing that there was a disconnection. In this manner, the traffic redirect module 29 preserves the transport connection when an underlying physical link temporarily disconnects, thus avoiding a negative user experience.

Figure 9:
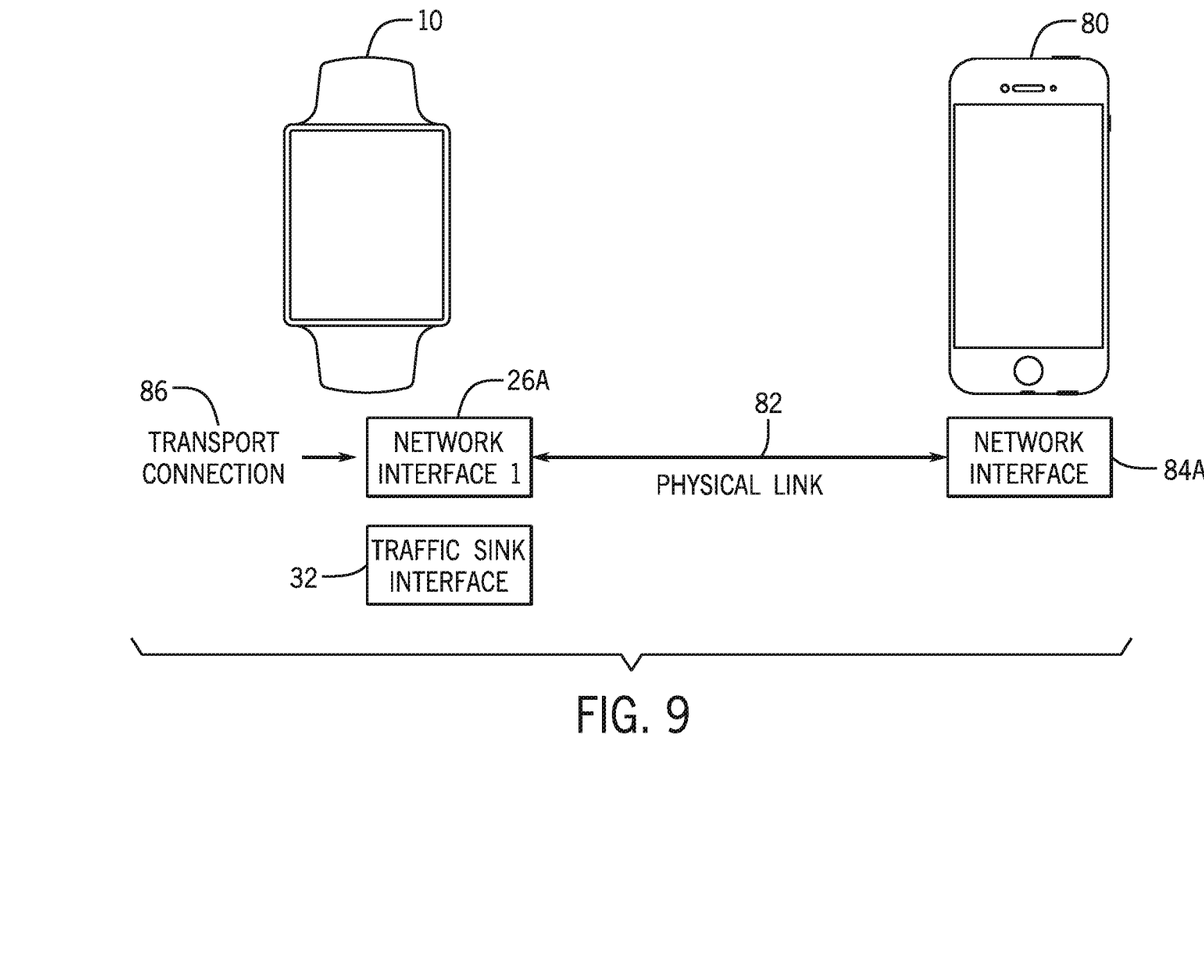
FIG. 9 is a schematic diagram illustrating the electronic device of FIG. 1 connected to another electronic device over a physical link using a network interface, according to embodiments of the present disclosure.

FIG. 9 is a schematic diagram illustrating the electronic device 10 connected to another electronic device 80 over a physical link 82, according to embodiments of the present disclosure. As illustrated, the electronic device 10 may be a wearable electronic device (e.g., 10E) and the other electronic device 80 may be a handheld device (e.g., 10B), though it should be understood that the disclosed techniques may apply to any suitable electronic devices (e.g., two handheld devices, a wearable electronic device and a computer (e.g., 10D), two wearable electronic devices, and so on). The physical link 82 may include a Bluetooth, Wi-Fi, or WAN (e.g., cellular and/or Wi-Fi) link. The processor 12 may create Network Interface 1 to communicate with a corresponding network interface 84A of the other electronic device 80 over the physical link 82. In some embodiment, for example, Network Interface 1 and the network interface 84A of the other electronic device 80 may include IPSec interfaces (e.g., in transport mode, tunnel mode, or any other suitable operating mode that enables communication between the two electronic devices 10, 80).

The processor 12 may also establish a transport connection 86 (e.g., a TCP or UDP connection) over the physical link 82. The processor 12 may install one or more policies in the policy table 31 to steer data to be sent to the other electronic device 80 over the transport connection 86 to use the generated Network Interface 1. As illustrated, the processor 12 has already created the traffic sink interface 32. In some cases, the processor 12 may create the traffic sink interface 32 when the connection daemon is running on the electronic device 10, since the connection daemon 30 sets up and manages connectivity between the electronic device 10 to other electronic devices (e.g., including the other electronic device 80). In additional or alternative embodiments, the processor 12 may create the traffic sink interface 32 upon startup of the electronic device 10, in response to the physical link 82 disconnecting, in response to removing a network interface 26 (e.g., Network Interface 1), and so on.

Figure 10:
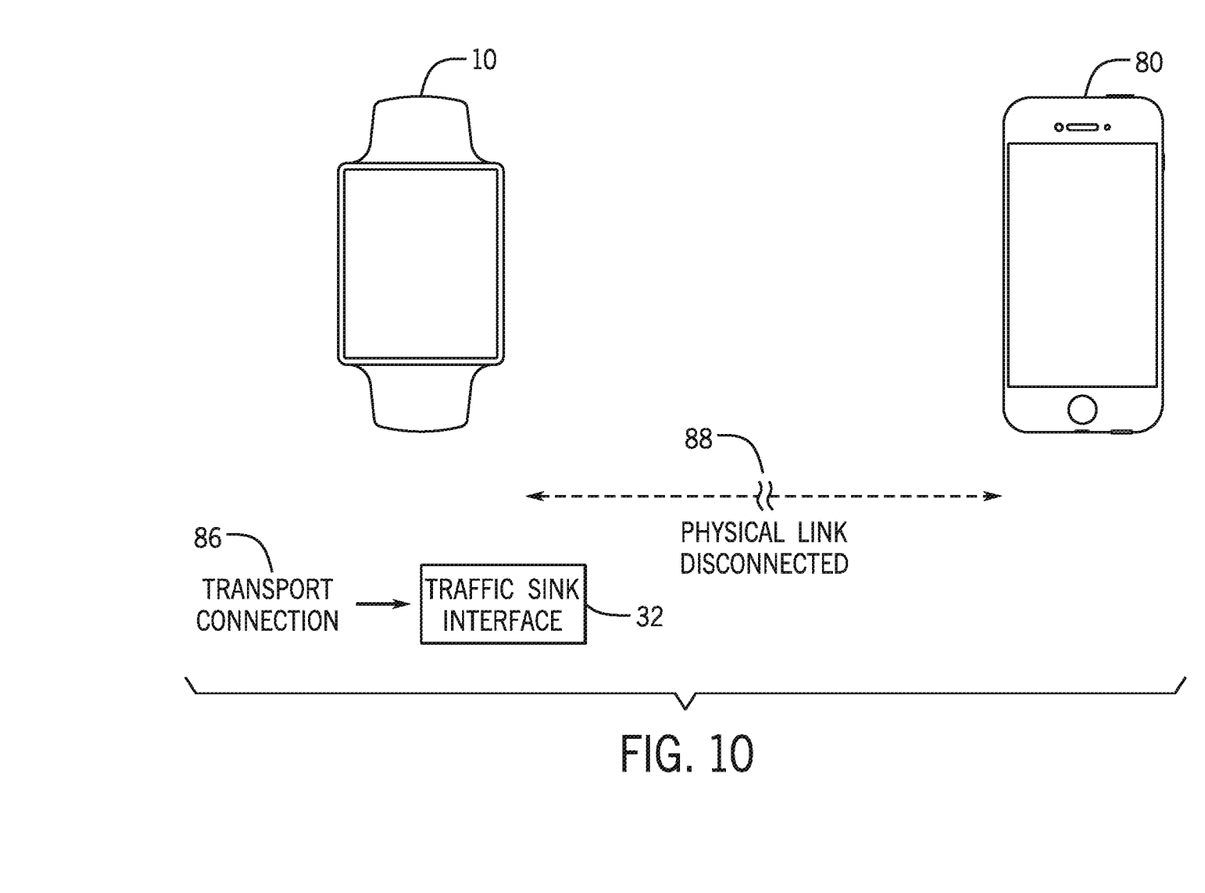
FIG. 10 is a schematic diagram illustrating the physical link of FIG. 9 disconnecting and the electronic device of FIG. 1 using a traffic sink interface, according to embodiments of the present disclosure.

However, in FIG. 10, the physical link 82 between the electronic device 10 and the other electronic device 80 has disconnected 88. This may be because the electronic device 10 moved out of range of the other electronic device 80, there is congestion on the physical link 82, and the like. As a result, the processor 12 tears down Network Interface 1 (removing it from a networking stack of the electronic device 10). The traffic redirect module 29 redirects traffic (e.g., outgoing data packets intended to be sent to the other electronic device 80) to use the traffic sink interface 32. In particular, the traffic redirect module 29 may install policies in the policy table 31 to steer data to be sent to the other electronic device 80 to use the traffic sink interface 32. The traffic redirect module 29 may configure the traffic sink interface 32 to have similar characteristics as the removed Network Interface 1, such as the same address assignment, same supporting routes, and so on. As such, the processor 12 sends data over the transport connection 86 using the traffic sink interface 32, rather than indicating that the physical link has disconnected 88.

Figure 11:
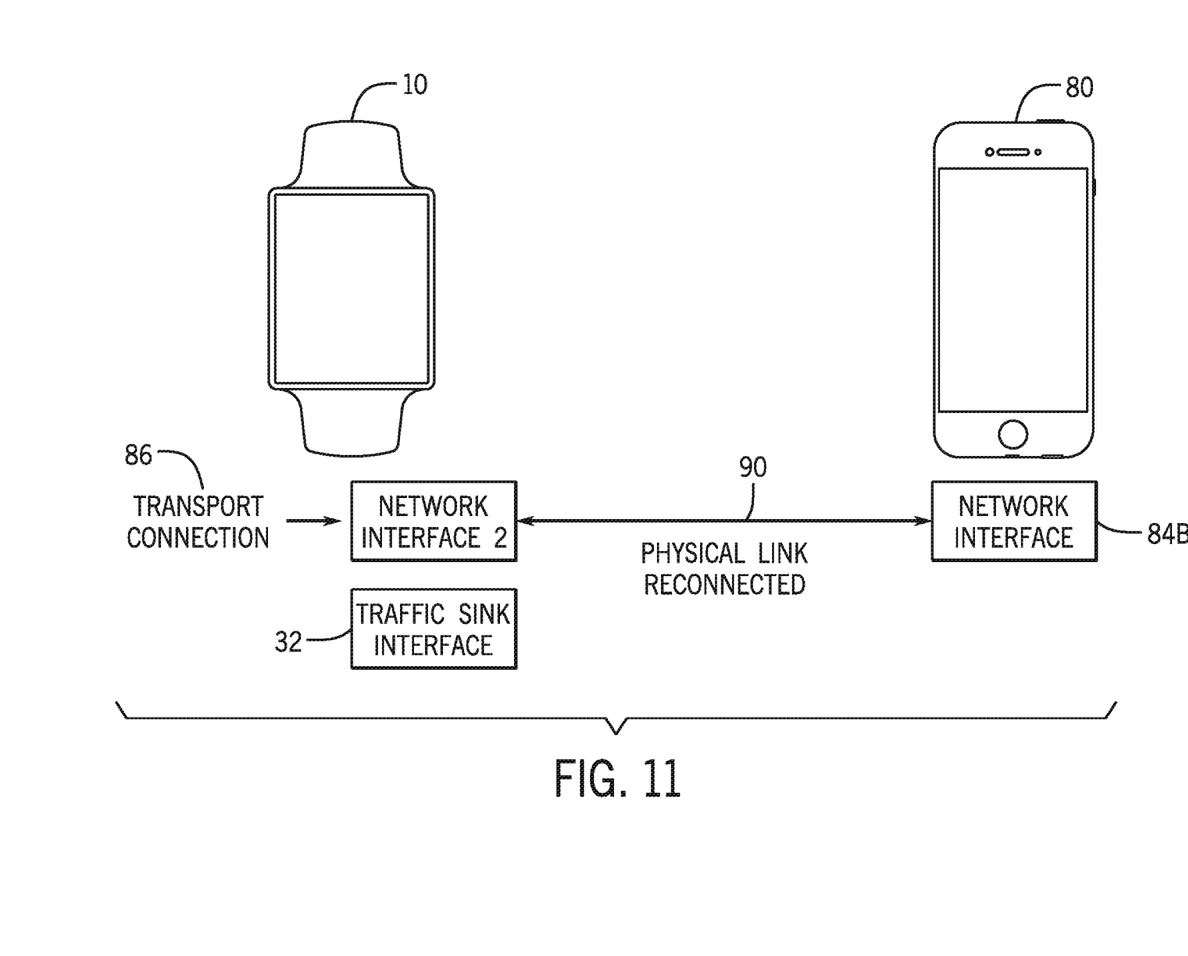
FIG. 11 is a schematic diagram illustrating the physical link of FIG. 9 reconnecting and the electronic device of FIG. 1 using a new network interface, according to embodiments of the present disclosure.

In FIG. 11, the physical link has been reconnected 90 or a new physical link has been established between the electronic device 10 and the other electronic device 80. As a result, the processor 12 creates a new Network Interface 2 to connect to a network interface 84B of the other electronic device 80 using the transport connection 86 over the reconnected or new physical link 90. The processor 12 then reinstalls the policies in the policy table 31 to steer data to be sent to the other electronic device 80 over the transport connection 86 to use the new Network Interface 2.

Figure 12:
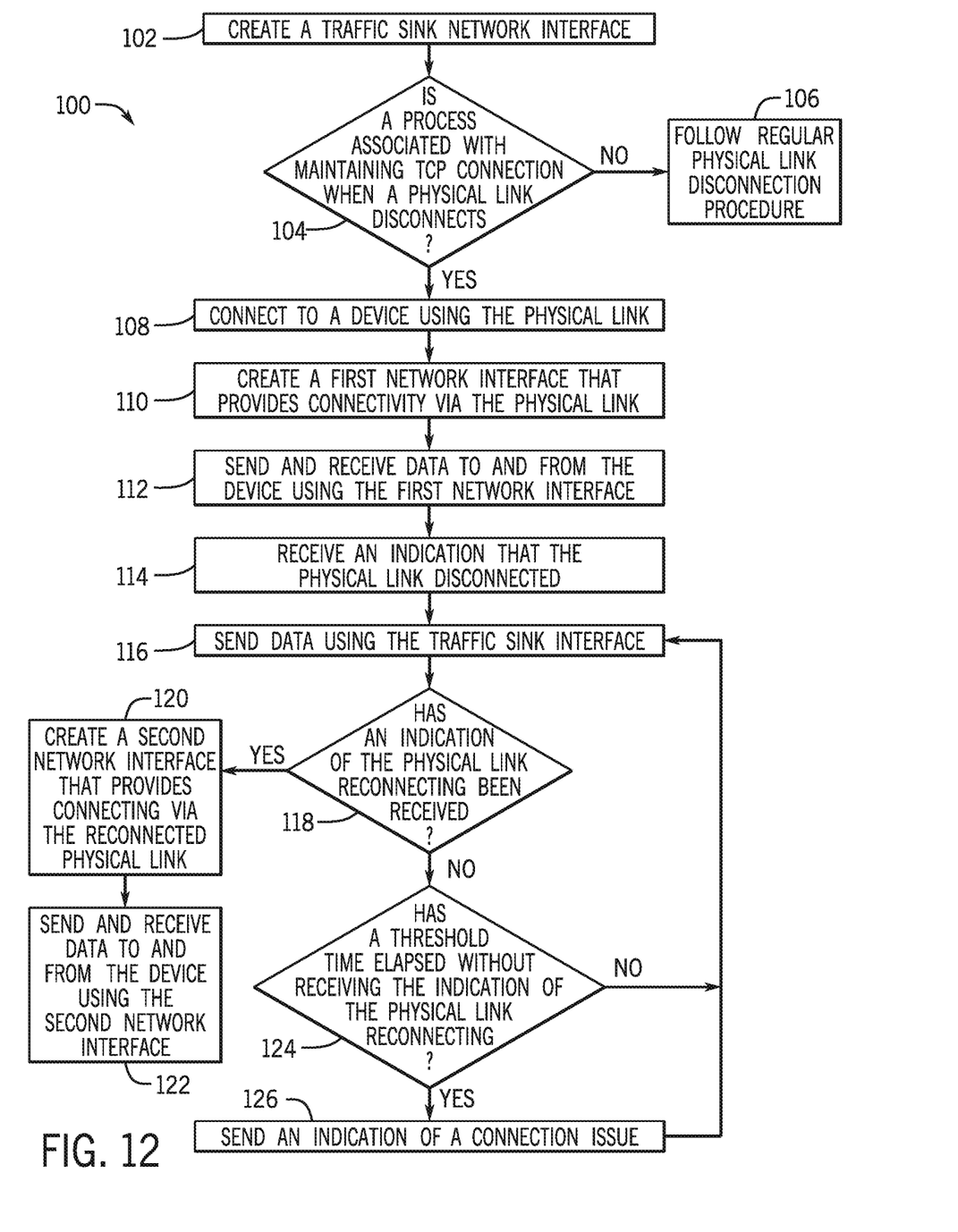
FIG. 12 is a flowchart of a method for maintaining a transport connection when the physical link disconnects, according to embodiments of the present disclosure.

FIG. 12 is a flowchart of a method 100 for maintaining a transport connection 86 when an underlying physical link 82 disconnects, according to embodiments of the present disclosure. Any suitable device (e.g., a controller) that may control components of the electronic device 10, such as the processor 12, may perform the method 100. In some embodiments, the method 100 may be implemented by executing instructions stored in a tangible, non-transitory, computer-readable medium, such as the memory 14 or storage 16, using the processor 12. For example, the method 100 may be performed at least in part by one or more software components, such as an operating system of the electronic device 10, the traffic redirect module 29 (as described below), and the like. While the method 100 is described using steps in a specific sequence, it should be understood that the present disclosure contemplates that the described steps may be performed in different sequences than the sequence illustrated, and certain described steps may be skipped or not performed altogether.

In process block 102, the processor 12 and/or the traffic redirect module 29 creates a traffic sink interface 32. As mentioned above, the traffic sink interface 32 may be in place or exist as long as a connection daemon 30 that sets up and manages connectivity between the electronic device 10 to other electronic devices is running on the electronic device 10.

In decision block 104, the traffic redirect module 29 determines whether a process is associated with maintaining transport connectivity (e.g., 86) when a physical link (e.g., 82) disconnects. As referred to herein, a process may refer to an instance of a computer program that is being executed by one or many threads. The process may include the computer program code and its activity. Depending on the operating system executing the computer program, the process may be made up of multiple threads of execution that execute instructions concurrently. In some cases, it may not be desirable for a process to maintain transport connectivity 86 when the physical link 82 disconnects, for example, because the process may be programmed to act as soon as it is known that the physical link 82 disconnects.

In any case, if the traffic redirect module 29 determines that the process is not associated with maintaining transport connectivity 86 when a physical link 82 disconnects, then the traffic redirect module 29, in process block 106, follows the regular physical link disconnection procedure. That is, if the physical link 82 disconnects, then the processor 12 may also disconnect the transport connection 86 and not redirect traffic using the traffic redirect module 29 and the traffic sink interface 32.

Otherwise, if the traffic redirect module 29 determines that the process is associated with maintaining transport connectivity 86 when a physical link 82 disconnects, then the processor 12, in process block 108, connects to another electronic device (e.g., 80) using the physical link 82. In particular, the processor 12 may receive an indication to connect to the other electronic device 80 (e.g., from the other electronic device 80), or determine that it should connect to the other electronic device 80 (e.g., based on the process or another process running on the electronic device 10).

In process block 110, the processor 12 creates a first network interface (e.g., "Network Interface 1" 26A) that provides connectivity via the physical link 82. For example, the first network interface 26A may be an IPSec interface. The processor 12 may install one or more policies in the policy table 31 to steer data to be sent to the other electronic device 80 over the transport connection 86 to use the first network interface 26A. In process block 112, the processor 12 may send and receive data to and from the other electronic device 80 using the first network interface 26A.

In process block 114, the processor 12 and/or the traffic redirect module 29 receives an indication that the physical link 82 disconnected. This may be because the electronic device 10 moved out of range of the other electronic device 80, there is congestion on the physical link 82, and the like. As a result, the processor 12 tears down Network Interface 1 (removing it from a networking stack of the electronic device 10).

In response to receiving this indication, in process block 116, the traffic redirect module 29 sends data using the traffic sink interface 32. That is, the traffic redirect module 29 redirects traffic (e.g., outgoing data packets intended to be sent to the other electronic device 80) to use the traffic sink interface 32. In particular, the traffic redirect module 29 may install policies in the policy table 31 to steer data to be sent to the other electronic device 80 to use the traffic sink interface 32. The traffic redirect module 29 may configure the traffic sink interface 32 to have similar characteristics as the removed Network Interface 1, such as the same address assignment, same supporting routes, and so on. As such, the processor 12 sends data over the transport connection 86 using the traffic sink interface 32, rather than indicating that the physical link 82 has disconnected 88.

In decision block 118, the processor 12 and/or the traffic redirect module 29 determines whether an indication of the physical link 82 reconnecting or a new physical link being established has been received. For example, the electronic device 10 may be moved back within range of the other electronic device 80, congestion on the physical link 82 may have cleared up, or a new physical link of a different transport type may have been established. Thus, the physical link 82 may be reconnected or a new physical link may be established between the electronic device 10 and the other electronic device 80. As mentioned, it should be understood that the new physical link may be of a different transport type than the original physical link 82. For example, the original physical link 82 may have been a Bluetooth link that connected the electronic device 10 to the other electronic device 80, and when the Bluetooth link is disconnected, a new physical link of a different transport type (e.g., Wi-Fi or WAN) may be established to continue sending and receiving data between the electronic device 10 and the other electronic device 80.

If so, then, in process block 120, the processor 12 creates a second network interface (e.g., "Network Interface 2" 26B) that provides connectivity via the reconnected or new physical link 82. The processor 12 may reinstall one or more policies in the policy table 31 to steer data to be sent to the other electronic device 80 over the transport connection 86 to use the second network interface 26B. In process block 122, the processor 12 may send and receive data to and from the other electronic device 80 using the second network interface 26B.

If the processor 12 and/or the traffic redirect module 29 determines that an indication of the physical link 82 reconnecting or a new physical link being established has not been received, then, in decision block 124, the traffic redirect module 29 determines whether a threshold time has elapsed without receiving the indication. In particular, the threshold time may be indicative of the time to wait for reconnecting the physical link 82 or establishing a new physical link being excessive. As such, the threshold time may include any suitable time, such as between 3 and 120 seconds, 5 and 60 seconds, 10 and 30 seconds, and so on.

If the traffic redirect module 29 determines that the threshold time has elapsed, then, in process block 126, the traffic redirect module 29 sends an indication of a connection issue. In some embodiments, the indication may be sent to the processor 12 or another process, so that the connection issue may be dealt with and processed internally to the electronic device 10. For example, the processor 12 may attempt connection to the other electronic device 80 using other transport types, may restart portions of the network interface 26 or the electronic device 10, and so on. In alternative or additional embodiments, the indication may be visually displayed so that a user may be notified.

Afterward, or in the case that the traffic redirect module 29 determines that the threshold time has not elapsed, the traffic redirect module 29 returns to process block 116 and sends data using the traffic sink interface 32. In this manner, the method 100 may maintain the transport connection 86 when the underlying physical link 82 disconnects, sparing the user from the negative experience of receiving indications of disconnection prompts due to temporary physical link 82 disconnects.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. One or more tangible, non-transitory, computer-readable media, comprising computer-readable instructions that, when executed by one or more processors of a computer, cause the one or more processors to:
create a traffic sink interface at a transport layer;
connect to a device using a physical link;
create a first network interface that enables communication via the physical link;
send first data using the first network interface over the physical link;
receive a first indication that the physical link disconnected;
in response to receiving the first indication, send second data using the traffic sink interface within a threshold of time in lieu of sending the second data using the first network interface;
in response to receiving a second indication that the physical link reconnected within the threshold of time:
create a second network interface that enables communication via the physical link; and send third data using the second network interface over the physical link in lieu of sending the third data using the traffic sink interface; and after sending the second data using the traffic sink interface within the threshold of time, and in response to not receiving the second indication within the threshold of time, generate an error message.

2. The one or more tangible, non-transitory, computer-readable media of claim 1, wherein the computer-readable instructions cause the one or more processors to refrain from generating the error message by receiving the first indication that the physical link disconnected and sending the second data using the traffic sink interface.

3. The one or more tangible, non-transitory, computer-readable media of claim 1, wherein the computer-readable instructions that cause the one or more processors to send the first data using the first network interface by installing a first policy in a policy table configured to steer the first data to the first network interface.

4. The one or more tangible, non-transitory, computer-readable media of claim 3, wherein the computer-readable instructions cause the one or more processors to send the second data using the traffic sink interface by installing a second policy in the policy table configured to steer the second data to the traffic sink interface.

5. The one or more tangible, non-transitory, computer-readable media of claim 4, wherein the computer-readable instructions cause the one or more processors to send the third data using the second network interface by installing the first policy in the policy table configured to steer the third data to the second network interface.

6. The one or more tangible, non-transitory, computer-readable media of claim 1, wherein the traffic sink interface preserves a transport connection when the physical link is disconnected.

7. The one or more tangible, non-transitory, computer-readable media of claim 6, wherein the transport connection comprises a Transmission Control Protocol connection.

8. The one or more tangible, non-transitory, computer-readable media of claim 1, wherein the traffic sink interface comprises the same address assignment and the same supporting routes as the first network interface.

9. The one or more tangible, non-transitory, computer-readable media of claim 1, wherein the computer-readable instructions cause the one or more processors to send the second data using the traffic sink interface within the threshold of time by causing a traffic redirect module to redirect the second data to the traffic sink interface from the first network interface.

10. The one or more tangible, non-transitory, computer-readable media of claim 1, wherein the second data comprises a data packet intended to be sent to the device.

11. A computer-implemented method comprising:
connecting, via a computer, to an electronic device using a physical link;
creating a first network interface that enables communication with the electronic device via the physical link;
receiving a first indication that the physical link disconnected;
in response to receiving the first indication, sending data using a traffic sink interface within a threshold of time based on the physical link being disconnected;
in response to receiving a second indication that the physical link reconnected within the threshold of time, creating a second network interface that enables communication via the physical link; and
after sending the data using the traffic sink interface within the threshold of time, and in response to not receiving the second indication within the threshold of time, generating an error message on the electronic device.

12. The computer-implemented method of claim 11, wherein sending the data using the traffic sink interface does not send the data over the physical link.

13. The computer-implemented method of claim 11, comprising removing, via the computer, the first network interface in response to receiving the first indication that the physical link disconnected.

14. The computer-implemented method of claim 11, wherein the first network interface and the second network interface enable communication with the electronic device using a transport connection over the physical link.

15. The computer-implemented method of claim 14, wherein the transport connection comprises a Transmission Control Protocol or User Datagram Protocol connection.

16. An electronic device comprising:
a traffic sink interface;
a first network interface; and
processing circuitry configured to:
send first data using the first network interface over a physical link;
receive a first indication that the physical link disconnected;
in response to receiving the first indication, send second data using the traffic sink interface within a threshold of time in lieu of sending the second data using the first network interface;
in response to receiving a second indication that the physical link reconnected within the threshold of time:
create a second network interface that enables communication via the physical link; and
send third data using the second network interface over the physical link in lieu of sending the third data using the traffic sink interface; and
after sending the second data using the traffic sink interface within the threshold of time, and in response to not receiving the second indication within the threshold of time, generate an error message.

17. The electronic device of claim 16, wherein the traffic sink interface comprises the same address assignment and the same supporting routes as the first network interface.

18. The electronic device of claim 16, wherein the physical link comprises a Bluetooth, Wi-Fi, or WAN connection.

19. The electronic device of claim 16, wherein the traffic sink interface is configured not to send data.

20. The electronic device of claim 16, wherein the traffic sink interface preserves a transport connection when the physical link is disconnected.

* * * * *